United States Patent
Momose et al.

(10) Patent No.: US 6,171,002 B1
(45) Date of Patent: Jan. 9, 2001

(54) MAGNETIC READER AND PRINTER HAVING THE SAME

(75) Inventors: Tsutomu Momose; Akira Koyabu; Sadao Murata, all of Nagano (JP)

(73) Assignee: Seiko Epson Corporation (JP)

( * ) Notice: Under 35 U.S.C. 154(b), the term of this patent shall be extended for 0 days.

(21) Appl. No.: 09/283,786

(22) Filed: Apr. 1, 1999

(30) Foreign Application Priority Data

Apr. 1, 1998 (JP) ................................................. 10-088607

(51) Int. Cl.[7] .................................................... B41J 3/42
(52) U.S. Cl. ............................ 400/73; 400/105; 235/449
(58) Field of Search ............................. 400/73, 74, 61, 400/105, 582, 708; 235/379, 380, 449, 493

(56) References Cited

U.S. PATENT DOCUMENTS

| | | |
|---|---|---|
| 4,196,846 | 4/1980 | Kao et al. ............................. 235/475 |
| 4,456,236 | 6/1984 | Buddendeck ............................ 271/31 |
| 4,624,588 * | 11/1986 | Bivin ................................... 400/105 |
| 5,053,607 | 10/1991 | Carlson et al. ....................... 235/379 |
| 5,302,975 * | 4/1994 | Whritenor ............................ 346/136 |
| 5,613,783 * | 3/1997 | Kinney et al. .......................... 400/73 |
| 5,789,727 * | 8/1998 | Teradaira et al. ..................... 235/449 |
| 5,867,585 * | 2/1999 | Myers .................................. 382/139 |
| 5,895,904 * | 4/1999 | Nissim ................................. 235/380 |
| 5,965,862 * | 10/1999 | Momose ............................... 235/449 |

FOREIGN PATENT DOCUMENTS

| | | |
|---|---|---|
| 3704059 A1 | 8/1988 | (DE) . |
| 0 707 971 A2 | 4/1996 | (EP) . |

* cited by examiner

Primary Examiner—John S. Hilten
Assistant Examiner—Mina H. Chau
(74) Attorney, Agent, or Firm—Fish & Richardson P.C.

(57) ABSTRACT

A magnetic character reader capable of reading information recorded on a record sheet with an optional printer, the size of the magnetic character reader being reduced by use of a shortened record sheet transport passage. The magnetic character reader 50 includes: a reading unit 35 having a magnetic head 33 and a head presser 34; and a transport mechanism section 30 having a paper feed roller 21 and a paper pressing roller 22. The transport mechanism section 30 is arranged at a position adjacent to a reading unit 35 on reference line L which extends in a direction substantially perpendicular to a transport direction of a check P from a reading section of the reading unit 35. A paper feed roller 21 includes three transport sections 21a1 to 21a3. Three paper pressing rollers 22a1 to 22a3 which correspond to the three transport sections 21a1 to 21a3 also are provided.

20 Claims, 5 Drawing Sheets

MAGNETIC READER AND PRINTER HAVING THE SAME

FIELD OF THE INVENTION

The present invention relates to a magnetic reader for reading magnetic ink characters recorded on paper sheets and the like, such as checks, securities and other cards, cards or a recording sheet as including cards and sheets of paper, plastic and the like having information magnetically recorded thereon, which may be in the form of visually readable characters, such as MICR characters. Also, the present invention relates to a printer provided with the magnetic character reader.

BACKGROUND OF THE INVENTION

Recently, personal checks, on which pieces of information such as bank numbers, account numbers and so forth are printed by magnetic ink characters, are widely used for commercial transactions and shopping at stores. Accordingly, readers have been proposed for reading magnetic ink characters printed on personal checks. Such prior readers have a compound structure described as follows: magnetic heads are made to come into contact with magnetic ink characters printed on the surface of a personal check, so that the magnetic ink characters can be read, and at the same time, printing is conducted on the reverse side of the personal check by a printing head according to the content of reading. Such a prior art reader and problems encountered with it are further described in the detailed description below.

SUMMARY OF THE INVENTION

The preferred embodiment of the present invention has been accomplished in view of the above circumstances. It is an object of the preferred embodiment of the present invention to provide a magnetic character reader, the size of which is reduced by shortening the distance of transporting a record sheet, capable of reading information recorded in the direction of transporting a record sheet to the utmost. Also, it is an object of the preferred embodiment of the present invention to provide a printer into which the magnetic character reader is incorporated.

It is another object of the preferred embodiment of the present invention to provide a magnetic character reader capable of stably transporting a record sheet irrespective of a size of the record sheet and also capable of excellently reading magnetic ink characters printed on a check or other sheet or record sheet P.

In order to accomplish the above objects, the preferred embodiment of the present invention provides a magnetic character reader for reading magnetic information recorded on a record sheet comprising: a magnetic information detection head for detecting magnetic information recorded on the record sheet when the magnetic information detection head comes into contact with the record sheet; a reading unit having a magnetic information detection head for detecting magnetic information recorded on the record sheet when the magnetic information detection head comes into contact with the record sheet and a reading pressing member for pressing the record sheet against the magnetic information detection head; and a transport mechanism section having at least one transport member for transporting the record sheet and also having at least one transport pressing member for pressing the record sheet against the transport member, wherein the transport mechanism section is arranged at a position adjacent to the magnetic information detection head on a reference line extending from a reading section of the reading unit in a direction substantially perpendicular to the transporting direction of the record sheet.

Further, the preferred embodiment of the present invention provides a printer for conducting printing on a record sheet on which magnetic information is recorded, comprising: a magnetic information detection head for detecting magnetic information recorded on the record sheet when the magnetic information detection head comes into contact with the record sheet; a reading unit having a magnetic information detection head for detecting magnetic information recorded on the record sheet when the magnetic information detection head comes into contact with the record sheet and a reading pressing member for pressing the record sheet against the magnetic information detection head; a transport mechanism section having at least one transport member for transporting the record sheet and also having at least one transport pressing member for pressing the record sheet against the transport member, wherein the transport mechanism section is arranged at a position adjacent to the magnetic information detection head on a reference line extending from a reading section of the reading unit in a direction substantially perpendicular to the transport direction of the record sheet; and a printing mechanism section for conducting printing on the record sheet carried by the transport mechanism section according to the result of reading obtained by the magnetic information detection head. According to the preferred embodiment of the present invention having the above structure, when the reading unit and the transport mechanism section are arranged on a reference line extending in a direction substantially perpendicular to the record sheet transporting direction, it is possible to reduced a distance of the transport passage necessary for reading information recorded on the record sheet to the minimum. Further, unlike the prior art, there is generated no region in which information recorded on the record sheet can not be read. Therefore, it is possible to read information recorded on the record sheet to the utmost in the record sheet transport direction.

According to the preferred embodiment of the present invention, it is possible to provide a plurality of transport pressing members in a region in which a record sheet of the minimum width in the standard is carried.

According to the above arrangement, it is possible to transport even a record sheet of the minimum width in the standard when it is positively held by the transport member and the transport pressing member.

In this case, the plurality of transport pressing members can be composed so that the corresponding transport members can be respectively independently pressed.

According to the above arrangement, each transport pressing member comes into contact with the record sheet uniformly. Due to the foregoing, it is possible to avoid a biased contact condition of the transport pressing member with respect to a record sheet of different thickness.

In the preferred embodiment of the present invention, it is possible to compose a first transport mechanism section in which a plurality of transport pressing members are arranged at positions, between which a center line of the transport direction is interposed, in a range in which a record sheet of the minimum width in the standard is carried.

Due to the above arrangement, the record sheet can be given a substantially uniform intensity of transport force.

Further, the preferred embodiment of the present invention provides a printer, further comprising a second transport mechanism section having a transport member for transporting a record sheet arranged outside a range in which a record sheet of the minimum width in the standard is carried and also having a transport pressing member for pressing the record sheet against the transport member, wherein an intensity of pressing force in the second transport mechanism section is lower than an intensity of pressing force in the first transport mechanism section.

According to the arrangement described above, it is possible to ensure a primary transport force in the minimum record sheet width in the standard, and an auxiliary transport force is given by the second transport mechanism section arranged outside the minimum width of the record sheet in the standard. Due to the foregoing, record sheets of various widths can be stably carried, and reading and printing can be conducted in a good condition.

When a transport surface of the transport member is roughened, a coefficient of friction between the transport surface of the transport member and the record sheet can be increased. Therefore, it is possible to increase an intensity of transport force for transporting the record sheet without increasing an intensity of pressing force.

On the other hand, in the preferred embodiment of the present invention, the reading pressing member may be an elastic member, the contact surface with respect to the record sheet of which is curved in the transport direction of the record sheet.

Due to the above arrangement, a contact surface of the record sheet with the reading pressing member can be minimized, and a resistance of transporting the record sheet can be reduced. Different from a case in which a roller is used as the reading pressing member, a position of the contact surface is constant with respect to the magnetic information detection head. Therefore, even when iron powder is accumulated on the contact surface, a level of noise generated by the accumulated iron powder is substantially constant. Accordingly, the accumulated iron powder can be easily removed.

In the preferred embodiment of the present invention, the reading pressing member further includes a sheet member, the coefficient of friction of which is lower than that of the elastic member, arranged along a curved surface of the elastic member, and this sheet member can be contacted with the record sheet.

In this case, when the record sheet passes between the magnetic information detection head and the reading pressing member, a coefficient of friction between the sheet member and the record sheet may be not higher than 0.2.

Due to the above arrangement, friction between the record sheet and the reading pressing member can be reduced by the sheet member of a low coefficient of friction. Therefore, reliability of the apparatus can be further enhanced.

BRIEF DESCRIPTION OF THE DRAWINGS

FIG. 4 is a partially cross-sectional view in which a portion in the proximity of a head pressing member of this embodiment is enlarged, wherein FIG. 4 shows a condition in which the head pressing member is supported in a holding section of a support arm;

DETAILED DESCRIPTION OF PREFERRED EMBODIMENTS

Figure 1:
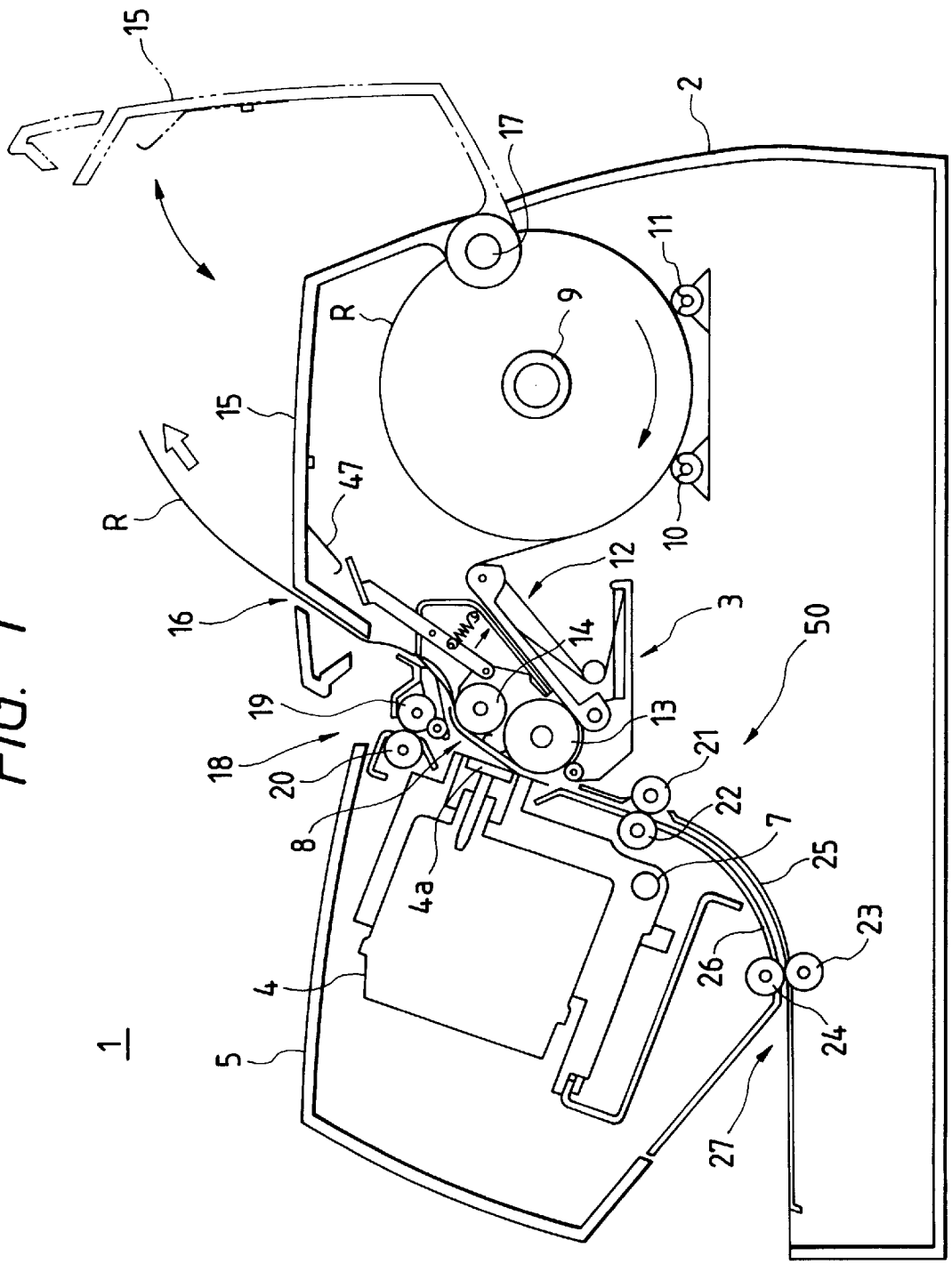
FIG. 1 is an overall arrangement view showing an inner structure of an embodiment of a compound processor 1 provided with a magnetic character reader and a printer of the preferred embodiment of the present invention.

Before describing the preferred embodiment of the present invention, we will describe the prior art compound structure mentioned above and shown in shown in FIGS. 5A and 5B. This magnetic character reader 100 includes: a transport mechanism section 102 for reciprocating a personal check or other sheetlike item P, which will be referred to as a check in this specification hereinafter, along a transport passage; and a reading unit 105 for reading magnetic ink characters 101 recorded on the surface of the check P. In this case, the reading unit 105 is arranged in a transport passage of the check P in the proximity of the transport mechanism section 102.

The transport mechanism section 102 includes: a transport roller 103 which is driven for rotation; and a sheet pressing roller 104 for pressing the check P against the transport roller 103. On the other hand, the reading unit 105 includes: a magnetic head 106 arranged at a position where the magnetic head 106 is capable of coming into contact with the magnetic ink characters 101 printed on the check P; and a head pressing roller 107 for pressing the check P against the magnetic head 106.

In order to prevent the occurrence of interference between the transport mechanism section 102 and the reading unit 105, the transport section of the transport mechanism section 102 and the reading unit 105 are separated from each other by a predetermined distance.

In the above magnetic character reader 100, the magnetic ink characters 101 on the check P can be read in such a manner that the check P is made to come into close contact with the magnetic head 106 by the head pressing roller 107 while the check P is being carried by the transport mechanism section 102 at a predetermined speed in the direction of arrow A.

However, the following problems may be encountered in the above conventional magnetic character reader 100.

Figure 5A:
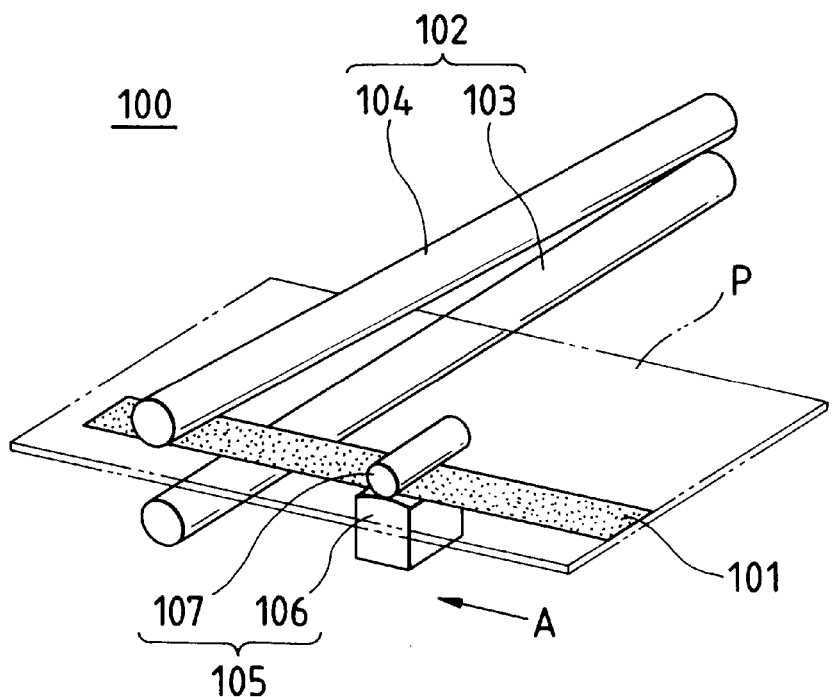
FIG. 5A is a perspective view showing an outline of the arrangement of a magnetic character reader of the prior art.

As shown in FIG. 5A, in the arrangement of the prior art, it is necessary to provide a passage of a predetermined distance between the transport mechanism 102 and the reading unit 105. Therefore, length of the transport passage for transporting a record sheet is extended, that is, it becomes difficult to reduce the size of the magnetic character reader.

Further, in the arrangement of the prior art, it is impossible to read magnetic ink characters on a check in a region corresponding to a distance between the transport mechanism section 102 and the reading unit 105. Therefore, a space in which magnetic ink characters MICR can be read is restricted.

Further, in the arrangement of the prior art, when the magnetic ink characters 101 are read, the head pressing roller 107 presses edge portions of the check P against the magnetic head 106. Accordingly, a biased back tension is generated by the reading unit 105 with respect to a transport force of the transport mechanism section 102. As a result, there is a possibility that the check P is skewed when it is carried.

Figure 5B:
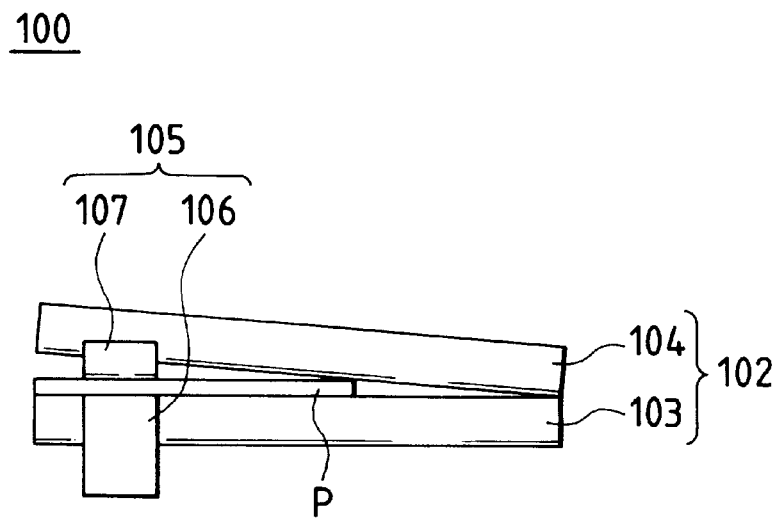
FIG. 5B is a front view showing an outline of the arrangement of a magnetic character reader of the prior art.

Furthermore, in the arrangement of the prior art, the following problems may be encountered. When a record sheet such as a check P or a cutform, the width of which is different, is pressed between the transport roller 103 and the sheet pressing roller 104 as shown in FIG. 5B, there is caused a step portion which is formed between a portion where a sheet of paper exists and a portion where no sheet of paper exists. Due to the above step portion, the sheet pressing roller 104 partially comes into contact with a record sheet, for example, a check P. Therefore, the sheet pressing roller 104 is inclined with respect to the transport roller 103. In other words, there is caused a condition of biased contact. For the above reasons, there is a possibility that the check P is skewed in the transport process.

Referring to the appended drawings, a preferred embodiment of the present invention will be explained as follows.

FIG. 1 is an overall arrangement view showing an inner structure of an embodiment of a compound processor 1 provided with a magnetic character reader and printer of this embodiment. In this invention, the record sheet also includes the magnetic record sheets to which the printing operation could not be applied.

This compound processor 1 has two functions. One is a reading function of reading magnetic ink characters recorded, for example, on a check, and the other is a printing function of conducting printing on a record sheet such as a check.

As shown in FIG. 1, in the compound processor 1, a roll of paper R is provided at the rear in the body cover 2 made of, for example, resin. On the front side of the roll of paper R, a paper transport section 3 is provided for transporting the roll of paper R.

On the other hand, on the front side of the paper transport section 3, a printing section 4 is provided for conducting printing on the roll of paper R, and this printing section 4 is arranged at a position adjacent to the paper transport section 3. This printing section 4 is covered with a front body cover 5 made of resin.

This printing section 4 conducts printing by means of ink jet. This printing section 4 can be freely moved between both side sections of a body frame (not shown) in the drawing along guide rails 7 attached to the body frame. Since this compound processor 1 is composed as described above, printing can be conducted in both the direction of feeding paper and the direction perpendicular to it.

As shown in FIG. 1, in this printing section 4, a printing head 4a is provided in a portion opposed to a platen 8 arranged in the paper transport section 3.

On the other hand, the roll of paper R is rotatably supported by a pair of support rollers 10, 11 which are arranged in parallel to a core section 9. A forward end portion of the roll of paper R can be drawn out from the lower side of the apparatus body to the upper side.

In the paper transport section 3, there is formed a transport passage for transporting the roll of paper R. The paper transport section 3 inverts a feeding direction of the roll of paper R by the paper guide 12 and the transport roller 13, and the roll of paper R, on which printing has been conducted, is discharged from a discharging port 16 formed on the body cover 15.

As shown in FIG. 1, the body cover 15 is pivotally attached so that it can be rotated round a support shaft 17. Due to the foregoing, the body cover 15 can cover the roll of paper R.

At the center of the upper portion of the body, a discharging port 18 for discharging a check P is formed by the upper body cover 15 and the front body cover 5. A pair of upper rollers 19, 20 is provided in the proximity of this discharging port 18. A transport roller 21 and a paper pressing roller 22 which are opposed to each other are located between the paper transport section 3 and the printing section 4. A pair of insertion rollers 23, 24, capable of coming into contact and separating from each other, is provided in the proximity of a paper insertion port 27. Further, there are provided a pair of guide members 25, 26 which extend from the front portion of the apparatus to the upper rollers 19, 20 via the insertion rollers 23, 24, transport roller 21 and paper pressing roller 22. Due to the foregoing, the paper insertion port 27 and the transport passage for transporting the check P are formed.

Figure 2:
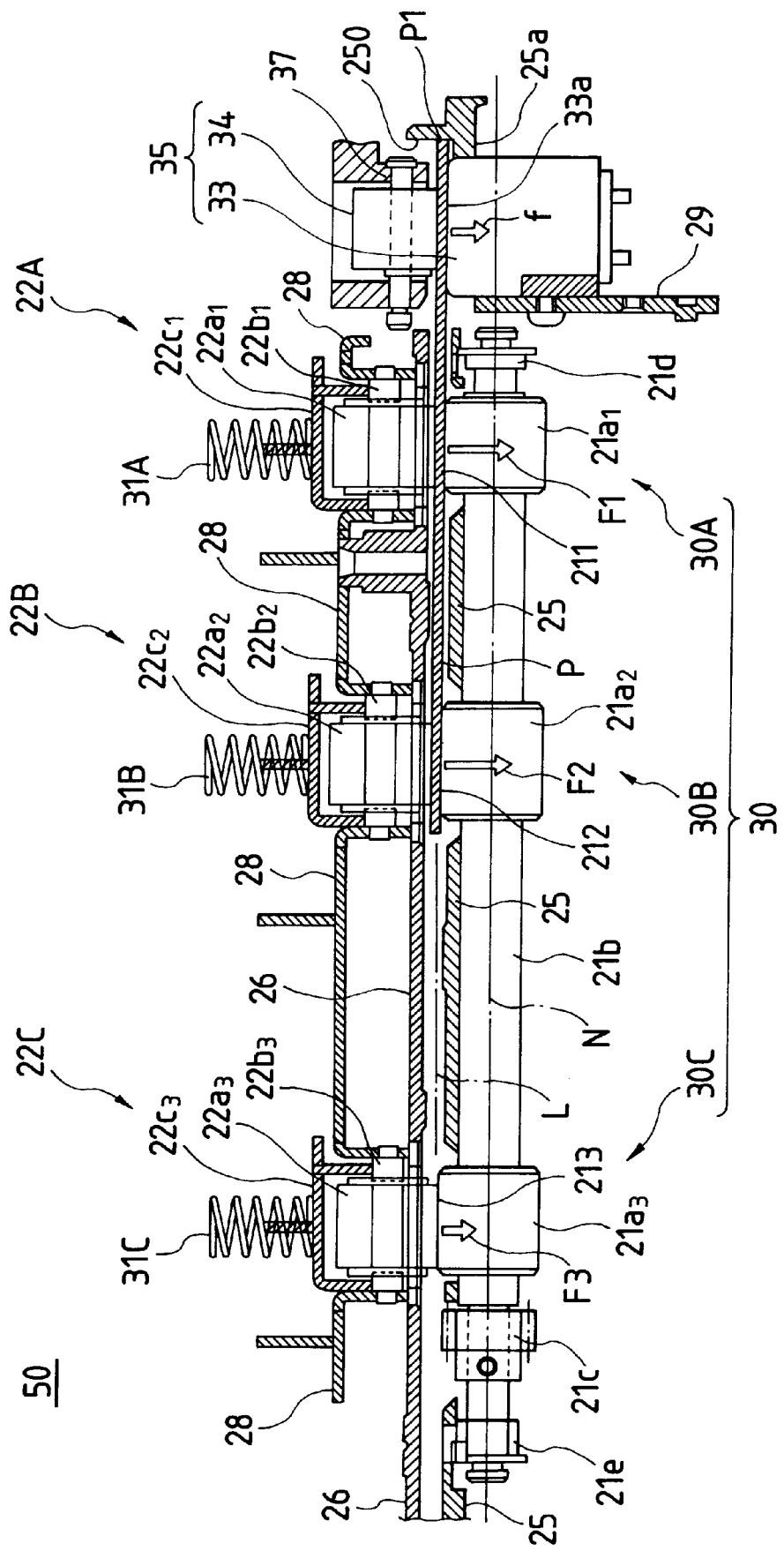
FIG. 2 is a front view showing an outline of a primary section of a magnetic character reader of the embodiment, wherein the view is taken in the traverse direction of a transport passage.
Figure 3:
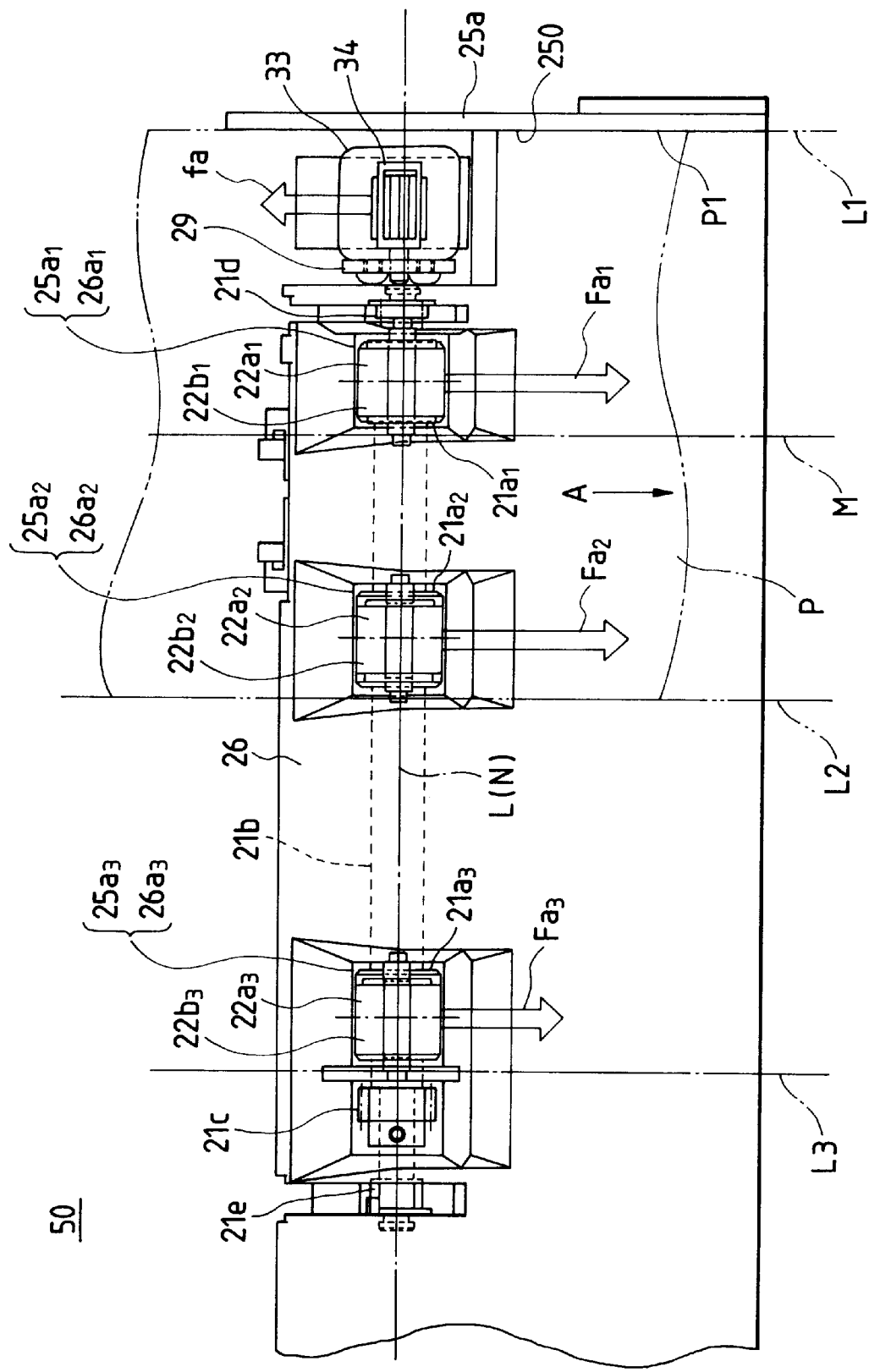
FIG. 3 is a plan view showing an outline of a primary section of the magnetic character reader shown in FIG. 2, wherein the view is taken from an upper side of a transport passage.

FIG. 2 is a front view showing an outline of a primary section of a magnetic character reader of the embodiment, wherein the view is taken in the traverse direction of a transport passage, and FIG. 3 is a plan view showing an outline of a primary section of the magnetic character reader shown in FIG. 2, wherein the view is taken from an upper side of a transport passage.

The magnetic character reader 50 of this embodiment includes: a transport roller (transport member) 21 arranged in the compound processor 1 shown in FIG. 1; and a reading unit 35 arranged in the proximity of the paper pressing roller (paper pressing member) 22.

As shown in FIGS. 2 and 3, at one end portion (the right end portion in the drawing) of the guide member 25, a reference section 25a is provided for guiding a reference end edge P1 on a side on which magnetic ink characters (not shown) on the check P are recorded.

In the proximity of this positioning section 25a, a reading section 35 is provided having a magnetic head (magnetic information detection head) 33 for reading magnetic ink characters and a head pressing member (reading pressing member) 34 for pressing the check P against the magnetic head 33 so that the check P can come into close contact with the magnetic head 33.

In this case, the magnetic head 33 and the head pressing member 34 are arranged on both sides of the transport passage being opposed to each other.

As shown in FIG. 2, on the guide member 25 side with respect to the transport passage, the magnetic head 33 is fixed to the support member 29, and a reading surface 33a for reading the magnetic ink characters is directed to the guide member 26 side.

The head pressing member 34 is arranged in such a manner that the contact surface 34a is opposed to the reading surface 33a of the magnetic head 33. The head pressing member 34 is fixed to a support arm which is attached to a solenoid (not shown). When the support arm is moved upward and downward by the action of the solenoid, the head pressing member 34 is contacted with and separated from the reading surface 33a of the magnetic head 33.

In this embodiment, when a force of a spring (not shown) is appropriately adjusted, a pressing force of the magnetic head 33 against the reading surface 33a can be properly adjusted. In this case, a proper pressing force of the magnetic head 33 against the reading surface 33a is 120 to 180 gf.

Figure 4:
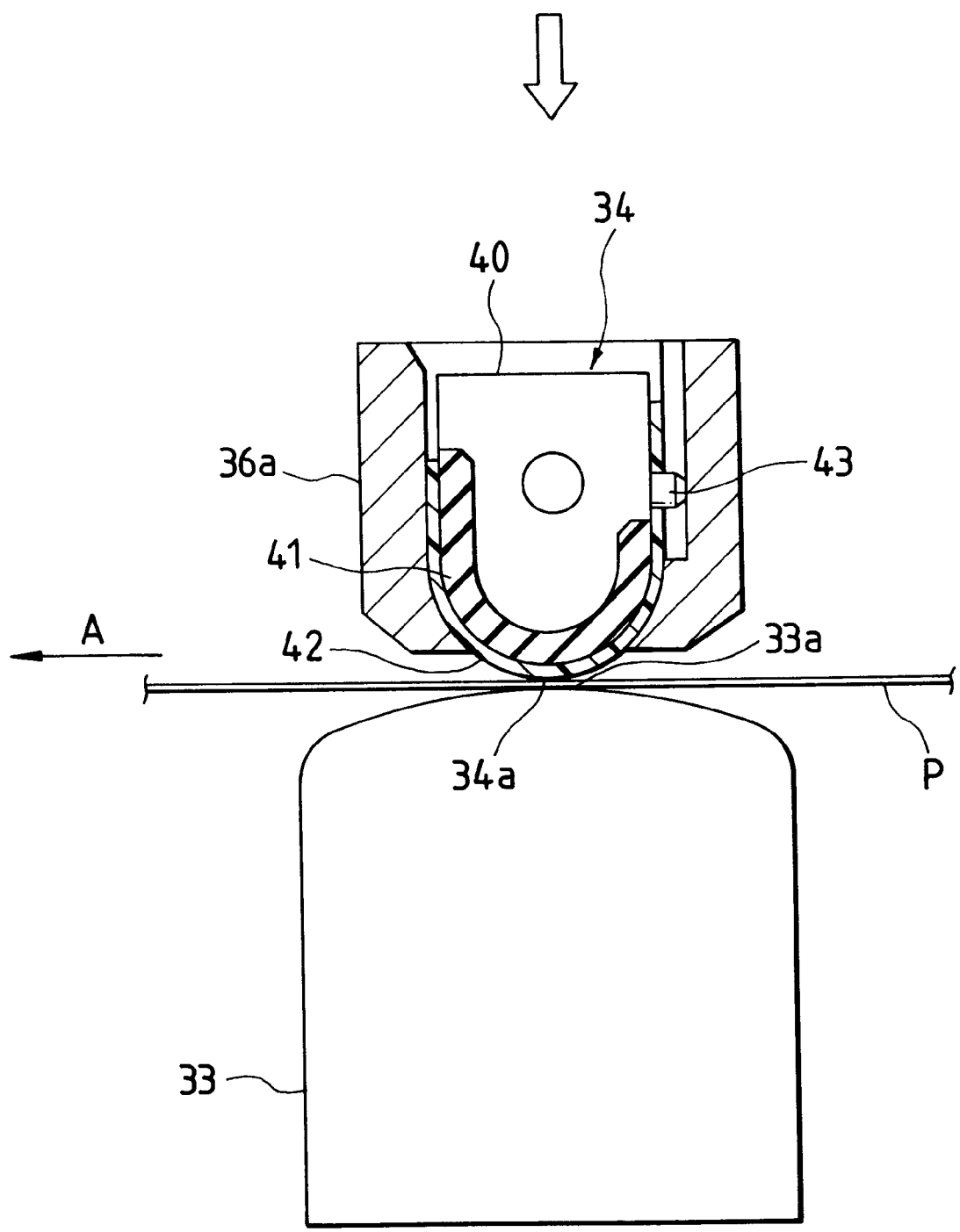

FIG. 4 is a partially cross-sectional view in which a portion in the proximity of a head pressing member of this embodiment is enlarged, wherein FIG. 4 shows a condition in which the head pressing member is supported in a holding section of a support arm.

As shown in FIGS. 2 and 4, the head pressing member 34 is fixed by a fixing pin 37 which is inserted into the holding section 36a formed in the support arm and penetrates the head pressing member 34 and the holding section 36a.

The head pressing member 34 includes: a base mount 40; an elastic member 41 arranged in a portion on the magnetic head 33 side of the base mount 40; and a sheet-shaped member 42 arranged on the elastic member 41.

In this case, a portion of the base mount 40 on the magnetic head 33 side is curved along the transport direction of the check P, and the elastic member 41 is made to adhere onto the curved surface. The sheet-shaped member 42 is arranged along a surface of the elastic member 41. Accordingly, the check P to be carried directly comes into contact with the surface of this sheet-shaped member 42, and the surface of the elastic member 41 is curved in a direction of transporting the check P.

By the action of the elastic member 41, a contact surface 34a of the head pressing member 34 can be deformed so that the check P can be curved along the magnetic head 33 when the check P is pressed against the magnetic head 33.

When the sheet-shaped member 42 is not pressed against the magnetic head 33, the surface of the sheet-shaped member 42 is curved along the curved surface of the elastic member 41, however, when the check P to be carried is pressed onto the magnetic head 33 side, the surface of the sheet-shaped member 42 comes into contact with the check P because the elastic member 41 is deformed by a pressing force given between the magnetic head 33 and the head pressing member 34.

Due to the foregoing, the check P comes into close contact with the reading surface 33a of the magnetic head 33. Therefore, accuracy of reading the magnetic ink characters can be enhanced when reading is conducted on the reading surface 33a.

In this embodiment, examples of usable material of the elastic member 41 are: rubber such as acrylonitrile butadiene rubber (NBR), styrene butadiene rubber (SBR), polyurethane rubber and fluorine-contained rubber; and resin such as thermoplastic elastomer. A specific example of thermoplastic elastomer is "Santoplane" (brand name of Mitsubishi Monsanto Kasei K. K.), the hardness of which is 55, and this thermoplastic elastomer is formed into a sheet, the thickness of which is approximately 1 mm so that it can be used as the elastic member.

A material having a friction coefficient which is lower than that of the elastic member 41 is selected for the sheet-shaped member 42. The friction coefficient of a common elastic body is not lower than 0.8. Therefore, it is preferable to use material, the friction coefficient of which is not higher than that. More preferably, material having a friction coefficient not higher than 0.2 is used for the sheet-shaped member. Specifically, it is possible to use a film made of tetra-fluoroethylene or polyethylene of high polymer. For example, it is possible to use "Ultra-High Polymer Polyethylene Tape" (brand name of Daikyo Giken Kogyo K. K.), the thickness of which is 0.1 mm and the friction coefficient of which is 0.16.

In this embodiment, the sheet-shaped member 42 is made to adhere onto a surface of the elastic member 41 by adhesive, the adhesion strength of which is low, so that it can be easily peeled off, that is, the sheet-shaped member 42 is not completely fixed onto the surface of the elastic member 41.

However, since the head pressing member 34 is press-fitted into the holding section 36a of a support arm (not shown) in the drawing, the sheet-shaped member 42 is pressed against an inner wall of the holding section 36a. Therefore, the sheet-shaped member 42 can be closely contacted with the elastic member 41.

On the sheet-shaped member 42, there is formed a hole (not shown), which is engaged with a protrusion 43 arranged on the base mount 40 on the upstream side in the transport direction of the check P.

As shown in FIG. 4, since the sheet-shaped member 42 directly comes into contact with the check P, it is drawn to the downstream side of the transport direction by the friction caused between the sheet-shaped member 42 and the check P. Since the protrusion 43 on the base mount 40 and the hole on the sheet-shaped member 42 are engaged with each other, the sheet-shaped member 42 can be prevented from slipping off when it is drawn in the process of transporting the check P.

On the other hand, even if the surface of the sheet-shaped member 42, which comes into contact with the check P, is plastically elongated when it is used over a long period of time, since the sheet-shaped member 42 is not completely fixed onto the elastic member 41, this elongation generated on the sheet-shaped member 42 is released onto the downstream side. Therefore, the elastic member 41 and the sheet-shaped member 42 can be closely contacted with each other in the proximity of the reading surface 33a.

According to this embodiment having the above structure of the head pressing member 34, a contact surface of the check P with the head pressing member 34 can be minimized. Therefore, resistance of transporting the check P can be reduced, and accuracy of transporting the check P can be enhanced.

Different from a case in which a roller is used as the reading pressing member, a position of the contact surface 34a is constant with respect to the magnetic head 33. Therefore, even when iron powder is accumulated on the contact surface, a level of noise generated by the accumulated iron powder is substantially constant. Accordingly, the accumulated iron powder can be easily removed.

In this embodiment, when a coefficient of friction between the sheet-shaped member 42 and the check P in the case of passing of the check P between the magnetic head 33 and the head pressing member 34 is kept to be not higher than 0.2, friction between the check P and the head pressing member 34 can be reduced, and reliability of the apparatus can be further enhanced.

As shown in FIGS. 2 and 3, in this embodiment, a transport mechanism section 30 is provided in an adjacent portion on the other end side (the left end portion in the drawing) of the guide members 25, 26 with respect to the reading unit 35. The transport mechanism section 30 is composed of a transport roller 21 and paper pressing sections 22A, 22B, 22C.

In this case, the transport roller 21 and paper pressing sections 22A, 22B, 22C are arranged along reference line L which passes on the reading surface 33a of the magnetic head 33 and extends in a direction substantially perpendicular to the record sheet transport direction (direction of arrow A). In this embodiment, the transport mechanism section 30 includes: first transport mechanism sections 30A, 30B having paper pressing sections 22A, 22B; and a second transport mechanism section 30C having a paper pressing section 22C.

As shown in FIG. 2, the transport roller 21 of the transport mechanism section 30 includes: a roller shaft 21b made of metal such as stainless steel; and three transport sections 21a1, 21a2, 21a3, wherein these members are integrated into one body. The transport roller 21 includes three transport sections 21a1, 21a2, 21a3 which are arranged at predetermined intervals on the roller shaft 21b extending along straight line N which is parallel to reference line L. Diameters of the transport sections 21a1, 21a2, 21a3 of the transport roller 21 are larger than the outer diameter of the roller shaft 21b and equal to each other.

Further, the apparatus is composed as follows. Contact positions 211, 212, 213 of the transport sections 21a1, 21a2, 21a3 of the transport roller 21 with the check P are located on reference line L, that is, the contact positions 211, 212, 213 are located at the same positions as those of the reading surface 33a of the magnetic head 33 with respect to the transport direction.

Both end sections of the roller shaft 21b of the transport roller 21 are rotatably supported by the bearings 21d, 21e.

Further, a drive force of a drive motor (not shown) is transmitted to a gear 21c fixed to the roller shaft 21b in the proximity of the 25 transport section 21a3.

As shown in FIGS. 2 and 3, the transport sections 21a1, 21a2, 21a3 of the transport roller 21 partially protrude toward the guide member 26 from holes 25a1 to 25a3 formed in the guide member 25.

The outer circumferences of the transport sections 21a1, 21a2, 21a3 of the transport roller 21 are roughened, for example, by means of thermal spray of plasma. In this case, examples of thermal spray materials are: alumina, stainless steel, oxide such as chromium oxide, and carbide such as tungsten carbide and chromium carbide. When the outer circumferences of the transport sections are roughened as described above, a coefficient of friction with respect to the check P can be increased, and it becomes possible to obtain a high intensity of transport force and enhance the transporting accuracy.

On the other hand, as shown in FIG. 2, a plurality of paper pressing sections 22A, 22B, 22C are located at positions corresponding to the transport sections 21a1, 21a2, 21a3 of the transport roller 21.

In this case, the paper pressing sections 22A, 22B, 22C respectively have paper pressing rollers 22a1, 22a2, 22a3 made of elastic material such as rubber, capable of being freely rotated. Roller shafts 22b1, 22b2, 22b3 of the paper pressing rollers 22a1, 22a2, 22a3 are supported, for example, by long holes (not shown) of the roller fixing holding section 28. Therefore, the paper pressing rollers 22a1, 22a2, 22a3 can be freely contacted with and separated from the transport sections 21a1, 21a2, 21a3 of the transport roller 21.

Diameters of the paper pressing rollers 22a1, 22a2, 22a3 are the same. As shown in FIG. 2, the roller shafts 22b1, 22b2, 22b3 are arranged in line in parallel with reference line L.

Roller pressing members 22c1, 22c2, 22c3, which come into contact with the roller shafts 22b1, 22b2, 22b3 on the opposite side to the transport roller 21, are located in the upper portions of the paper pressing rollers 22a1, 22a2, 22a3. The roller pressing members 22c1, 22c2, 22c3 are pushed by the compression coil springs 31A, 31B, 31C, so that the paper pressing rollers 22a1, 22a2, 22a3 are respectively and independently pushed to the transport sections 21a1, 21a2, 21a3 of the transport roller 21.

Next, explanations will be made to positional relations between the transport sections 21a1, 21a2, 21a3 of the transport roller 21 and the paper pressing sections 22A, 22B, 22C of the paper pressing roller in the magnetic character reader 50 of this embodiment.

In FIG. 3, a line containing the guide surface 250 of the reference section 25a of the guide member 25 is defined as reference line L1. A line extending in the record sheet transport direction at a position distant from reference line L1 by 68 mm in a direction perpendicular to the record sheet transport direction (direction of arrow A) is defined as reference line L2, wherein distance 68 mm corresponds to the minimum width of the check P in the standard. Further, a line extending in the record sheet 25 transport direction at a position distant by a distance corresponding to the maximum width of the check P to be processed by the compound processor 1 is defined as reference line L3.

As shown in FIGS. 2 and 3, the magnetic character reader 50 of this embodiment includes a magnetic head 33 and a head pressing member 34, a transport section 21a1 of the transport roller 21 and a paper pressing roller 22a1, and a transport section 21a2 of the transport roller 21 and a paper pressing roller 22a2 in this order in the range interposed between reference lines L1 and L2.

In this case, a straight line extending in the car transport direction at the center between reference lines L1 and L2 is defined as line M as shown in FIG. 3. Then, the transport section 21a1 of the transport roller 21 and the paper pressing roller 22a1 are arranged in a range interposed between reference line L1 and straight line M, and the transport section 21a2 and the paper pressing roller 22a2 are arranged in a range interposed between reference line L2 and straight line M.

On the other hand, in a range interposed between reference lines L2 and L3, the transport section 21a3 of the transport roller 21 and the paper pressing roller 22a3 are arranged.

In this embodiment, the following expression (1) is satisfied.

$$f < F3 < F1, F2 \tag{1}$$

where F1, F2 and F3 are forces of pushing the transport roller 21 by the paper pressing rollers 22a1 to 22a3, wherein these pushing forces are generated by the compression coil springs 31A to 31C, and f is a force of pushing the magnetic head 33 by the head pressing member 34.

In this connection, pushing forces F1 and F2 given by the paper pressing rollers 22a1, 22a2 to the transport roller 21 are made to be substantially equal to each other.

As shown in FIGS. 1 and 3, when a check P is subjected to compound processing in the above compound processor 1, reference end edge P1 of the check P is made to collide with a guide surface 250 of the reference section 25a of the guide member 25 so as to conduct positioning. Under the above condition, the check P is inserted into the paper insertion port 27. In this case, the magnetic ink characters recorded on the check P are located at positions opposed to the magnetic head 33.

When a check P is detected by a paper detector (not shown) in the drawing, the insertion rollers 23, 24, which are separate from each other, hold the check P and carries it to the transport roller 21 and the paper pressing roller 22 of the magnetic character reader 50.

When an end portion of the check P arrives at the contact positions 211, 212 with the check P, the transport roller 23 and the insertion roller are stopped, and the insertion roller is set in an isolate condition, and the support arm is moved, so that the head pressing member 34 is made to come into pressure contact with the reading surface 33a of the magnetic head 33 via the check P.

After that, while the transport roller 23 is being reversed and the check P is being carried to the paper insertion port 27 side, the magnetic ink characters recorded on the check P are read by the magnetic character reader 50. This reading is conducted until a forward end portion of the check P arrives at the contact positions 211, 212 of the transport roller 23 with the check P. After that, the support arm is moved, and the head pressing member 34 is separated from the magnetic head 33 and the pressure contact transport roller is normally rotated.

The check P is carried by the transport roller 21 and the paper pressing roller 22 to the printing section 4. Then, printing is conducted on the check P. After the completion of printing, the check P is discharged from the discharging port 18.

In this embodiment, the reading unit 35 and the transport mechanism section 30 are arranged on reference line L extending in a direction substantially perpendicular to the direction of transporting the record sheet. Therefore, it is possible to minimize a length of the transport passage which is necessary for reading the record sheet, and at the same time unlike a case of the prior art in which a portion of the recorded information can not be read, information recorded at the maximum in the direction of transporting the record sheet can be read.

In this connection, in this embodiment, for example, when a check P of 68 mm width, which is the minimum width in the standard, is inserted into the record sheet reader, as shown in FIG. 2, the check P is carried being interposed between the two transport sections $21a1$, $21a2$ of the transport roller 21 and also interposed between the two paper pressing rollers $22a1$, $22a2$.

In the transport sections $21a1$, $21a2$ of the transport roller 21, the check P is given transport forces Fa1, Fa2 according to pushing forces F1, F2 of the paper pressing rollers $22a1$, $22a2$ and also according to the coefficient of friction between the transport sections $21a1$, $21a2$ and the check P.

On the other hand, by the magnetic head 33, the check P is given pushing force f and stopping force fa in accordance with the coefficient of friction between the magnetic head 33 and the check P.

In this embodiment, pushing forces F1 and F2 of the paper pressing rollers $22a1$, $22a2$ to the transport roller 21 are higher than pushing force f of the head pressing member 34 to the magnetic head 33. Further, as described before, since the outer circumferences (transport surfaces) of the transport sections $21a1$ to $21a3$ of the transport roller 21 are roughened, transport forces Fa1 and Fa2 given by the transport roller 21 are considerably higher than stopping force fa given by the magnetic head 33.

Therefore, because transport force Fa1 of the transport roller 21 arranged at a position adjacent to the reading unit 35 is sufficiently high, it is possible to neglect an influence given by stopping force fa in the reading unit 35. Due to the foregoing, no sheet of paper is skewed when it is carried, and the check P can be smoothly carried by the transport sections $21a1$ to $21a3$ of the transport roller 21.

As shown in FIG. 3, the paper pressing rollers $22a1$, $22a2$ are respectively arranged on both sides of straight line M which is located at the center of the check P, and the check is carried under the above condition. Accordingly, it is possible to give substantially equal transport forces onto the check P and transport it stably.

In this embodiment, since the two paper pressing rollers $22a1$, $22a2$ independently push the check P, it is possible to transport the check P by uniform transport forces. Due to the foregoing, not only the check P but also a record sheet such as a sheet of slip paper, the thickness of the right portion and the thickness of the left portion of which are different from each other, can be stably carried in a stable condition without causing a biased contact.

When a check P (not shown), the width of which is maximum, is inserted, the transport forces Fa1 and Fa2 are given to this check P by the transport sections $21a1$, $21a2$ of the first transport mechanism section. In addition to that, the transport force Fa3 is given to this check P by the transport section $21a3$ of the second transport mechanism section.

As can be seen in the above expression (1), this transport force Fa3 is lower than the transport forces Fa1, Fa2 of the transport sections $21a1$, $21a2$ of the transport roller 21 and higher than the stopping force fa of the magnetic head 33.

Therefore, according to this embodiment having the above structure, in the minimum width in the standard, a primary transport force can be ensured by the transport sections $21a1$, $21a2$ of the transport roller 21, and further an auxiliary transport force is given by the transport section $21a3$ of the transport roller 21 arranged outside the minimum width in the standard. Due to the foregoing, even a check P of the maximum width can be stably carried, and reading can be conducted in a good condition on the magnetic ink characters recorded even on the check P of the maximum width. Concerning a check P, the width of which is in a range between the maximum and the minimum, the primary transport forces Fa1 and Fa2 are ensured at the center in the paper width direction. Therefore, the check P, the width of which is in a range between the maximum and the minimum, can be stably carried in the same manner as that of the sheets of personal check P of the maximum and the minimum width.

In this connection, it should be noted that the present invention is not limited to the above specific embodiment, but variations may be made by one skilled in the art without departing from the scope of the invention.

For example, in the above embodiment, a check on which printing can be conducted is used as the record sheet, and a printer is used as the apparatus. However, it is possible to provide the same effect by a record sheet on which printing can not be conducted. Also, it is possible to use a magnetic character reader by which magnetic information recorded on a record sheet is read in.

For example, in the above embodiment, a transport roller is used, the surface of which has been roughened by means of thermal spraying of plasma. However, it should be noted that the present invention is not limited to the above specific embodiment. For example, it is possible to use a transport roller, the surface of which is coated with powder of alumina or stainless steel.

Further, in the above embodiment, two sets of paper pressing sections for pressing a sheet of paper are arranged in the minimum width of the check of the standard, and further one set of paper pressing section is arranged outside the minimum width of the check. However, as long as it does not depart from the scope of claim of the present invention, an arbitrary number of paper pressing rollers may be arranged inside and outside the minimum width of the check of the standard.

Furthermore, concerning the elastic member for pushing the roller pressing member, it is possible to use a torsion coil spring, tension spring and leaf spring instead of a compression coil spring.

What is claimed is:

1. A magnetic character reader for reading magnetic information recorded on a record sheet comprising:

a reading unit having a magnetic information detection head for detecting magnetic information recorded on the record sheet when the magnetic information detection head comes into contact with the record sheet and a reading pressing member for pressing the record sheet against the magnetic information detection head; and a transport mechanism section having at least one transport member for transporting the record sheet and also having at least one transport pressing member for pressing the record sheet against the transport member, wherein the transport mechanism section is arranged at a position adjacent to the magnetic information detection head on a reference line extending from a reading section of the reading unit in a direction substantially perpendicular to the transport direction of the record sheet.

2. The magnetic character reader according to claim 1, wherein the transport mechanism section includes a first transport mechanism section having a plurality of paper pressing member arranged in a range in which a record sheet of the minimum width in the standard is carried.

3. The magnetic character reader according to claim 2, wherein the plurality of transport pressing members are capable of independently pressing the corresponding transport members.

4. The magnetic character reader according to claim 2, wherein the plurality of transport pressing members are arranged at positions, between which a center line in the transport direction is interposed, in a range in which a record sheet of the minimum width in the standard is carried.

5. The magnetic character reader according to claim 2, wherein the transport mechanism section includes a second transport mechanism section having a transport member for transporting a record sheet arranged outside a range in which a record sheet of the minimum width in the standard is carried and also having a transport pressing member for pressing the record sheet against the transport member, wherein an intensity of pressing force in the second transport mechanism section is lower than an intensity of pressing force in the first transport mechanism section.

6. The magnetic character reader according to claim 1, wherein a transport surface of the transport member is roughened.

7. The magnetic character reader according to claim 1, wherein the reading pressing member is composed of an elastic member, the contact surface with the record sheet of which is curved in the direction of transporting a record sheet.

8. The magnetic character reader according to claim 1, wherein the reading pressing member further comprises an elastic member and a sheet member having a coefficient of friction of which is lower than that of the elastic member, said sheet member being arranged along a curved surface of the elastic member, and said sheet member can be contacted with a record sheet.

9. The magnetic character reader according to claim 8, wherein a coefficient of friction between the sheet member and the record sheet is not higher than 0.2 when the record sheet passes between the magnetic information detection head and the reading pressing member.

10. A printer for printing on a record sheet on which magnetic information is recorded, comprising:

a reading unit having a magnetic information detection head for detecting magnetic information recorded on the record sheet when the magnetic information detection head comes into contact with the record sheet and a reading pressing member for pressing the record sheet against the magnetic information detection head;

a transport mechanism section having at least one transport member for transporting the record sheet and also having at least one transport pressing member for pressing the record sheet against the transport member, wherein the transport mechanism section is arranged at a position adjacent to the magnetic information detection head on a reference line extending from a reading section of the reading unit in a direction substantially perpendicular to the transport direction of the record sheet; and a printing mechanism section for printing on the record sheet carried by the transport mechanism section according to the result of reading obtained by the magnetic information detection head.

11. The printer according to claim 10, wherein the transport mechanism section includes a first transport mechanism section having a plurality of transport pressing member arranged in a range in which a record sheet of the minimum width in the standard is carried.

12. The printer according to claim 11, wherein the plurality of transport pressing members are capable of independently pressing the corresponding transport members.

13. The printer according to claim 11, wherein the plurality of transport pressing members are arranged at positions, between which a center line of the transport direction is interposed, in a range in which a record sheet of the minimum width in the standard is carried.

14. The printer according to claim 11, further comprising a second transport mechanism section having a transport member for transporting a record sheet arranged outside a range in which a record sheet of the minimum width in the standard is carried and also having a transport pressing member for pressing the record sheet against the transport member, wherein an intensity of pressing force in the second transport mechanism section is lower than an intensity of pressing force in the first transport mechanism section.

15. The printer according to claim 10, wherein the transport surface of the transport member is roughened.

16. The printer according to claim 10, wherein the reading pressing member is composed of an elastic member, the contact surface with the record sheet of which is curved in the direction of transporting the record sheet.

17. The printer according to claim 10, wherein the reading pressing member further comprises an elastic member and a sheet member having a coefficient of friction of which is lower than that of the elastic member, said sheet member being arranged along a curved surface of the elastic member, and said sheet member can be contacted with the record sheet.

18. The printer according to claim 17, wherein a coefficient of friction between the sheet member and the record sheet is not higher than 0.2 when the record sheet passes between the magnetic information detection head and the reading pressing member.

19. A printer for printing on a record sheet on which information is previously recorded, comprising:

a reading unit having an information detection head for detecting information recorded on the record sheet;

a transport mechanism section having at least one transport member for transporting the record sheet and also having at least one transport pressing member for pressing the record sheet against the transport member, wherein the transport mechanism section is arranged at a position adjacent to the information detection head on a reference line extending from a reading section of the reading unit in a direction substantially perpendicular to the transport direction of the record sheet;

wherein the transport mechanism section includes a first transport mechanism section having a plurality of transport pressing member arranged in a range in which a record sheet of a minimum standard width is carried, and a second transport mechanism section having a transport member for transporting a record sheet arranged outside a range in which a record sheet of the minimum standard width is carried and also having a transport pressing member for pressing the record sheet against the transport member, wherein an intensity of pressing force in the second transport mechanism section is lower than an intensity of pressing force in the first transport mechanism section; and wherein the plurality of transport pressing members are capable of independently pressing the corresponding transport members and are arranged at positions, between which a center line of the transport direction is interposed, in a range in which the record sheet of the minimum standard width is carried; and a printing mechanism section for printing on the record sheet carried by the transport mechanism section.

20. The printer according to claim 19 further comprising a read pressing member adjoining said information detection head, wherein the transport surface of the transport member is roughened, and the coefficient of friction between the read pressing member and the record sheet is not higher than 0.2 when the record sheet passes between the information detection head and the reading pressing member for pressing the record sheet against the information detection head.

* * * * *